United States Patent Office 3,519,547
Patented July 7, 1970

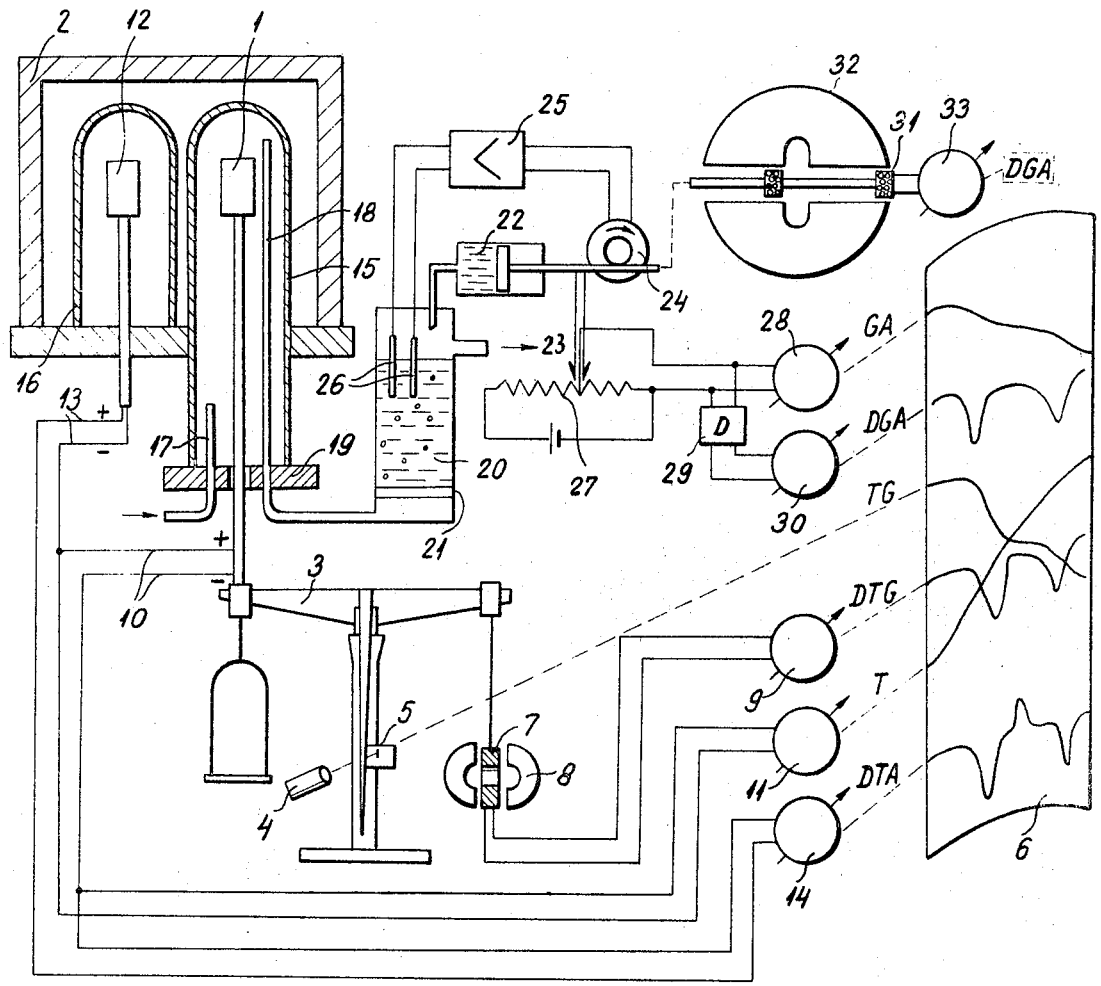

3,519,547
APPARATUS FOR GAS ANALYSIS
Ferenc Paulik, Jeno Paulik, and Laszlo Erdey, Budapest, Hungary, assignors to Magyar Tudomanyos Akademia (Hungarian Academy of Sciences), Budapest, Hungary
Filed June 2, 1967, Ser. No. 643,133
Claims priority, application Hungary, June 7, 1966, PA-882
Int. Cl. G01n 27/46
U.S. Cl. 204—195                                7 Claims

ABSTRACT OF THE DISCLOSURE

Apparatus to be connected to thermoanalytical equipment for the simultaneous automatic measuring of the amount of gas decomposition products formed in the course of thermal decomposition of substances, the process of gas formation and the speed of said process.

Thermal decomposition reactions often overlap one another either partly or wholly, and therefore the course of the individual partial reactions and the amount of the various gas decomposition products can not be determined at all or with an approximate accuracy only by means of the traditional thermoanalytical methods, such as thermogravimetry (TG), differential-thermal analysis (DTA) or dilatometric (TD) analysis.

If the partial reactions lead to the formation of different gas decomposition products, then the apparatus according to the invention permits—by determining the amount of the gas decomposition products and the process of gas formation—to determine separately the course of the partial reactions and to increase thereby the resolving power and selectivity of the thermoanalytical tests.

During the thermal decomposition of manganese ammonium phosphate monohydrate, for example, water and ammonia are released. No unambiguous image is, however, obtained of the course of thermal decomposition, not even if it is recorded by means of a derivatograph which is a complex thermoanalytical apparatus of high resolving power. The derivatograph is the object of an earlier Pat. No. 3,045,472 of the inventors, and is suitable for measuring simultaneously the temperature (T) and the change in weight (TG) of one and the same test sample, as well as the rate of its change in enthalpy (DTA) and of its change in weight (DTG). If, however, the ammonia gas released in the course of thermal decomposition is absorbed in water in accordance with the invention, and the absorption liquor is continuously and automatically titrated by means of a measuring liquor containing hydrochloric acid, then on the basis of the obtained titration curve (GA) it is possible to determine precisely the temperature at which the formation of ammonia has begun and ended, the course of the thermal decomposition in general and the composition of the intermediate products of the heated substance.

The apparatus according to the invention plots simultaneously also the first differential quotient curve of the titration curve (GA), the so-called derivative titration curve (DGA). The plotting of this latter curve is of great advantage, since on the one hand, due to its high resolving power, it considerably increases the accuracy of the qualitative and quantitative evaluation of the comparison curve, and enables, on the other hand, the comparison of the result of titration with other derivative thermoanalytical curves (DTA, DTG, etc.) representing the course of the bulk reaction.

Numerous automatic titration apparatuses of various designs are known which function by means of potentiometric, amperometric, conductometric or photoelectric end point indication, but all these are suitable for determining the composition of the solution of a given concentration and for the serial test of solution series respectively. An automatic titrating apparatus for testing processes, though of intermittent operation, was used hitherto only in the domain of biology for the purpose of maintaining at a constant value the pH of a nutrient solution which the microorganisms tend to alter in the course of time.

There is, however, no continuously operating automatic titrating apparatus known so far which would be suitable for determining the course of a gas formation by means of solvent absorption. Thus, of course, no apparatus is known which would operate in connection with thermonalytical apparatuses, or would be suitable for plotting the rate of the tested process and the derivative curve of the titration curve respectively.

An essential feature of the invention is also the circumstance that the apparatus according to the invention— owing to the fact that it determines the various weight, heat and dilatation, etc., effects of one and the same test sample as well as the course of its gas formation— realizes the perfect standardisation of the conditions of experiment and at the same time that of the results. According to earlier general practice the thermal effects of the test sample were analysed in separate apparatuses, by separate samples (thermobalance, dilatometer, etc.). In case of such parallel tests it is not possible to ensure the identity of the conditions of experiment. On the other hand, even the slightest deviation in the test conditions (compactness, thickness of layer of the test substance, shape of the test material holder, etc.) alters considerably the course of thermal decomposition. The results supplied by parallel tests of this kind are therefore rarely reliable and comparable.

The apparatus, according to the invention, therefore, achieves the following objectives: the apparatus connected to a thermoanalytical device accumulates quantitatively the gas decomposition products released from one and the same test sample, absorbs them in a solvent and titrates them continuously by means of a suitable measuring liquor in a titrating equipment controlled by an automatic, electrometric or photometric end point indicator and plots automatically the titration curve (GA) representing the result of the test, and its derivative curve (DGA) against time and temperature, together with the other thermoanalytical curves.

One of the embodiments of the apparatus according to the invention connected by way of example to the derivatograph is shown in the drawing.

The test sample is contained in a sample holding crucible 1 accommodated inside an electric furnace 2. The temperature of the furnace rises at a uniform rate. If the weight of the test sample changes in consequence of the thermal decomposition reaction, a balance arm 3 deviates and the image of an optical slot 5 illuminated by a lamp 4 and secured on the arm of the balance, plots on a photographic paper 6 the thermogravimetric curve (TG). On the arm of the balance there is suspended a winding 7 which lies in the field of permanent magnets 8. A galvanometer 9 connected to the poles of the winding deviates according to the voltage change of the induced current. This latter being proportional to the rate of change in weight, the galvanometer plots on the photographic paper the derivative thermogravimetric curve (DTG) as well. A thermoelement 10 extends into the interior of the test sample. A galvanometer 11 connected between the poles of the thermoelement records thus also the curve (T) representing the temperature change of the test sample. In a crucible 12 an inert substance is accommodated, the temperature change of which is measured by a thermoelement 13. Thermoelements 10 and 13 being connected by means of the opposition method, a galvanometer 14 inserted into the circuit measures the difference between the temperature of the test sample and that of the inert substance, this difference being proportional to the rate of change in the enthalpy of the test sample. Galvanometer 14 plots thus on the photographic paper also the differential-thermoanalytical curve (DTA). The afore-described part of the apparatus according to the invention is known "per se" and is identical with the afore-mentioned derivatograph.

Crucibles 1 and 12 containing the test sample and the inert substance are accommodated inside quartz tubes or covers 15 and 16 closed at their one end. The tube 15 comprises a chamber to confine gaseous decomposition products The carrier gas flows into tube 15 near its open lower part through a tube 17. Exit of the carrier gas together with the gas decomposition products take place through a tube 18 near the test sample. The open end of tube 15 is closed by a cover plate 19. It is of prime importance that no air should penetrate into tube 15 through the opening of the cover plate. This is preventible, if the amount of the inflow carrier gas is double or triple that of the carrier gas drawn off. In this manner a gas lock is established at the opening of cover plate 19. The gases released in the course of the thermal decomposition bubble through the solvent accommodated in an absorber 20 under the sucking action of a vacuum pump 23. The intense absorption of the gases is ensured by a glass filter 21 of fine porosity. Absorber 20 is connected with a piston-type sprayer 22 containing the reagent. The piston of the sprayer is actuated by a servo motor 24 operated by a control apparatus 25, whilst the operation of the control apparatus is regulated by an indicator and/or by reference electrodes 26 immersed in the absorption liquor. Servo motor 24 is in intercommunication with a potentiometer 27. On the slide of the potentiometer the voltage changes in proportion to the reagent volume displaced from the piston-type sprayer 22. Voltage change of the potentiometer is measured and recorded by a galvanometer 28. The curve GA plotted on the light-sensitive paper represents the change in the amount of the tested gas decomposition products. The potentiometer is—parallel to galvanometer 28—connected also with the primary coil of an adequately dimensioned transformer 29. According to the principle of transformers, in the secondary coil of the transformer the current flowing in the primary coil is in proportion to the rate of its voltage change, and indirectly to the rate of change in the amount of the gas decomposition product absorbed in the solvent. Thus a galvanometer 30 plots on a light-sensitive paper the derivative curve (DGA) of the titration curve. The voltage change of the potentiometer can be derived by means of a condenser resistance system known "per se" or of an electronic deriving device as well.

The titration curve can be derived—similarly to the curve TG—also by means of a deriving device of induction system. If the piston of the sprayer feeding the reagent is in forced interconnection with a winding 31 having a large number of turns and if the winding lies in a homogeneous field of force created by a pair of permanent magnets 32, then an electric voltage equally proportional to the rate of change in volume of the reagent solution is induced in winding 31. A galvanometer 33 connected to the poles of winding 31 plots thus also the derivative titrating curve (DGA) on the light-sensitive paper.

The above apparatus is always useful when the volatile component resulting from the evaporation, sublimation of the gas decomposition product (e.g. $H_2O$, $NH_3$, $HCl$, $SO_2$, $SO_3$, $CO_2$, $Cl_2$, etc.) or of that the substance is soluble in a solvent, and consequently the concentration and/or oxidation-reduction potential of the solution changes. This change is registered by indicator and/or reference electrodes 26. The control apparatus 25 is so constructed that when the voltage of the electric signal given by indicator and/or reference electrodes 26 exceeds a predetermined value corresponding to the point of equivalence, then the control apparatus 25 puts servo motor 24 in action and rotates it at such a speed which is in proportion to the difference between the voltage signalled by electrodes 26, and the preselected voltage.

With the apparatus according to the invention, in addition to the potentiometric indicator device consisting of the above-described indicator and/or reference electrodes 26, other indicating apparatuses operating according to the electrometric (e.g. conductometric, deadstop, etc.) and photometric principle are also applicable in order that the reagent liquid fed by the apparatus into the solution should correspond to the point of equivalence of the absorption liquor.

We claim:
1. Apparatus for the gas analysis testing of substances by heating, comprising means defining a chamber to receive a sample, means for heating a sample in the chamber, an absorber for retaining a liquid that absorbs gases emitted from the heated sample, means for conveying gases from the chamber to the absorber, electrode means in the absorber to contact liquid in the absorber and to emit electrical signals in response to changes in the composition of the liquid in the absorber, means responsive to said signals to add a titrating liquid to the liquid in the absorber, means for sensing and recording the quantity of said titrating liquid added to the liquid in the absorber, and means for sensing and recording the rate of addition of said titrating liquid to the liquid in the absorber.

2. Apparatus as claimed in claim 1, said sensing and recording means of the quantity of titrating liquid addition and rate of titrating liquid addition being responsive to movement of said adding means.

3. Apparatus as claimed in claim 1, said sensing and recording means displaying the quantity of added titrating liquid and the rate of addition of titrating liquid as coextensive traces.

4. Apparatus as claimed in claim 1, and means for introducing into said chamber a carrier gas other than said emitted gases.

5. Apparatus as claimed in claim 1, and means for sensing and recording the change in weight and rate of change in weight of the sample during heating.

6. Apparatus as claimed in claim 1, and means for sensing and recording the temperature and rate of change in temperature of the sample during heating.

7. Apparatus as claimed in claim 1, and means for sensing and recording the change in weight, the rate of change in weight, the temperature and the rate of change of temperature of said sample during heating, all of said sensing and recording means recording their respective parameters as coextensive traces.

References Cited

UNITED STATES PATENTS

| | | | |
|---|---|---|---|
| 2,621,671 | 12/1952 | Eckfeldt | 204—195 |
| 2,651,612 | 9/1953 | Haller | 204—195 |
| 2,773,746 | 12/1956 | Reehling | 23—230 |
| 3,045,472 | 7/1962 | Paulik et al. | |
| 3,058,901 | 10/1962 | Farrah | 204—195 |
| 3,146,181 | 8/1964 | Bell | 204—195 |
| 3,258,411 | 6/1966 | Hersch | 204—1.1 |

TA-HSUNG TUNG, Primary Examiner

U.S. Cl. X.R.

204—1; 23—232, 255; 73—15